Figure 1:
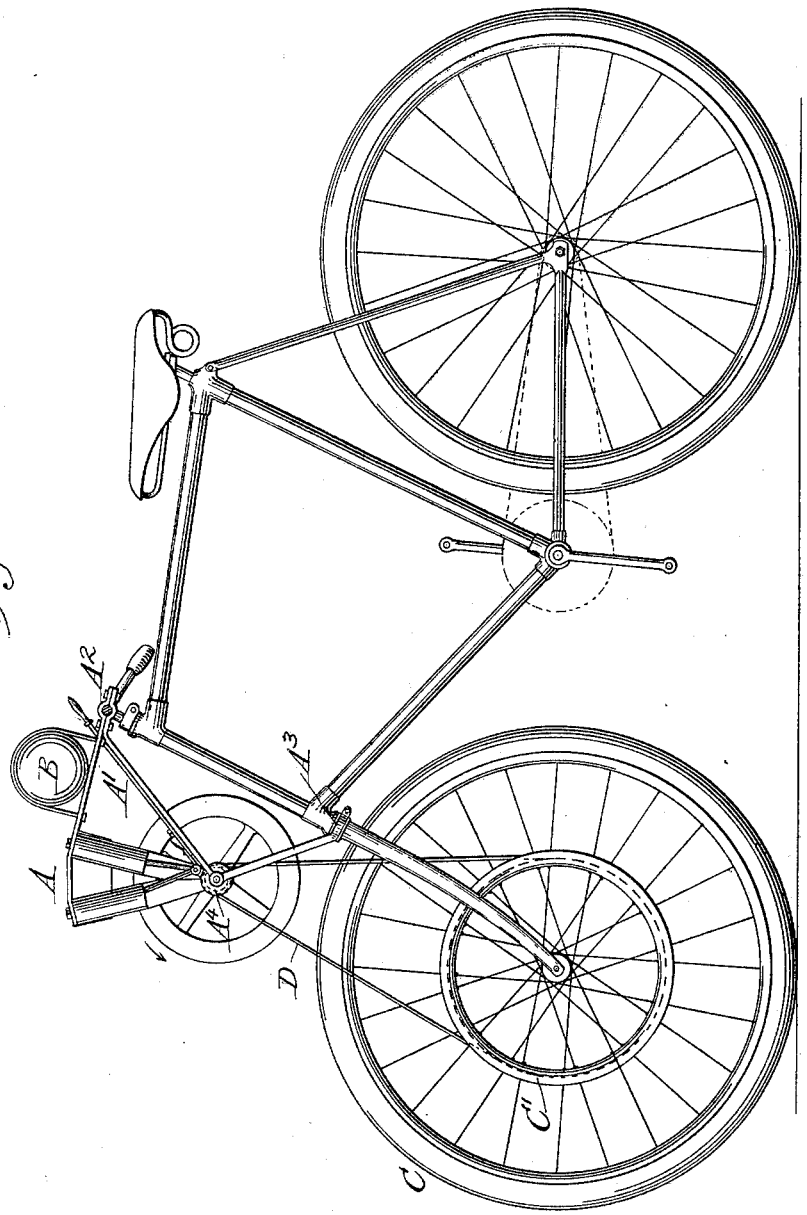

No. 626,295. Patented June 6, 1899.
E. J. PENNINGTON.
MOTOR ATTACHMENT FOR BICYCLES.
(Application filed Dec. 30, 1897.)
(No Model.) 2 Sheets—Sheet 1.

No. 626,295. Patented June 6, 1899.
E. J. PENNINGTON.
MOTOR ATTACHMENT FOR BICYCLES.
(Application filed Dec. 30, 1897.)

(No Model.) 2 Sheets—Sheet 2.

Witnesses
W. Halbert Smith.
Archine B Seibold.

Inventor
Edward J. Pennington
by [signature]
Attorney

UNITED STATES PATENT OFFICE.

EDWARD J. PENNINGTON, OF WALTON-UPON-THAMES, ENGLAND.

MOTOR ATTACHMENT FOR BICYCLES.

SPECIFICATION forming part of Letters Patent No. 626,295, dated June 6, 1899.

Application filed December 30, 1897. Serial No. 664,734. (No model.)

*To all whom it may concern:*

Be it known that I, EDWARD J. PENNINGTON, a citizen of the United States, residing at Walton-upon-Thames, county of Surrey, England, have invented certain new and useful Improvements in or Relating to the Application of Motive Power to Cycles, (for which I have obtained a patent in Great Britain, No. 14,769, dated July 3, 1896,) of which the following is a full, clear, and exact description.

This invention relates to the application of motive power to cycles, and I will describe it as involving the application of an oil-engine to a safety-bicycle, though other forms of engine may be employed, as desired.

One of the primary objects of the invention is to enable motive power to be applied to a cycle—in this case a safety-bicycle of ordinary construction—without necessarily altering the construction of the bicycle, although the frames may be specially constructed, if desired.

According to the present invention I provide a suitable motive-power engine, preferably one of the Pennington type of oil-engine, with any desired number of cylinders, by preference four, so as to reduce vibration. The engine is carried by or upon a suitable platform or frame, which may or may not be of tubular construction, and adapted to be clamped or otherwise firmly connected with the existing framing of the bicycle by suitable clamps, brackets, or the like. The actual fastening devices may with advantage consist of bolts with wing-nuts, which can be easily undone; but ordinary nuts may be employed or other suitable joints—as, for example, split couplings with nuts to join them—may be used, or, again, permanent connections may be provided upon the frame of the bicycle with which the engine-frame may be connected—for instance, tubular projections or sockets into which portions of the engine-frame may be fitted and secured by bayonet or other joints, or the sockets may be split and secured by nuts, as before described, or independent bolts and nuts may be used. It is intended to apply the power of the engine to the front or steering wheel of the bicycle, and for this purpose the engine connections may be made to the handle-bar or steering-fork, or both, so that the whole engine will move with the steering-wheel, and thus keep the connecting parts in proper alinement. As the engine moves with the steering-fork, ordinary driving mechanism, such as bands and pulleys or chain and chain-wheels, may be employed, or the driving may be from the engine-shaft by means of preferably a rubber-covered pulley or wheel in direct contact with the tire of the steering-wheel, the gearing down of the engine, if that be necessary, being conveniently provided by the relatively small diameter of the driving-pulley on the engine-shaft.

The oil-reservoir and sparking-battery may be connected with the frame or handle-bars or engine in any convenient manner, flexible or other accommodation devices being provided, if needed.

Figure 2:
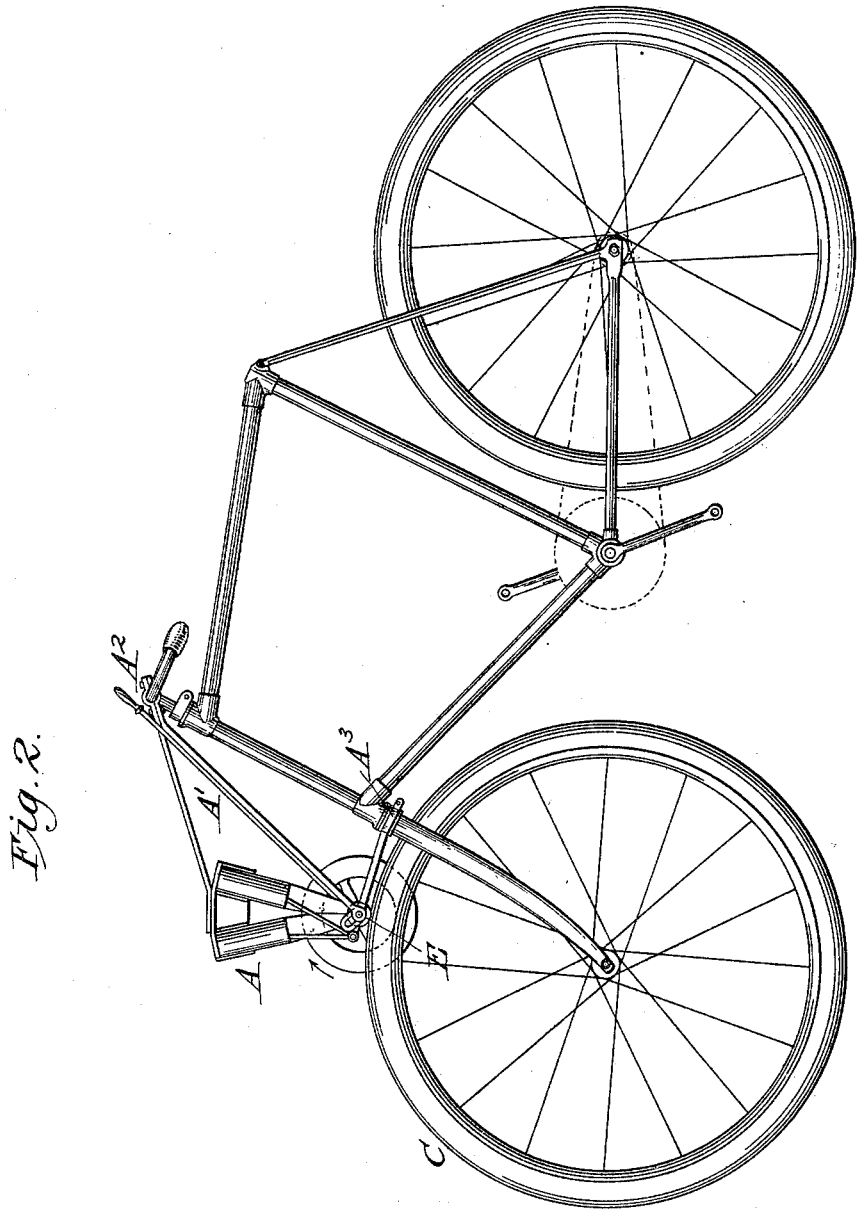

In the accompanying drawings, Figure 1 is a side elevation of a safety-bicycle and its motive apparatus secured to the steering-frame, showing one means of driving the steering-wheel. Fig. 2 is a similar view illustrating another means of connecting the motor to the steering-wheel.

Like letters indicate like parts throughout the drawings.

I will first describe Fig. 1. A represents the engine, which, as already explained, may be of any convenient description, but is preferably a four-cylinder Pennington oil-motor carried in or forming part of a framework A', the upper portion of which is secured, as at A², to the the the steering handle-bar of the bicycle, while the lower portion is secured, as at A³, to the crown of the steering-fork. By this means it will be seen that the motor turns with the steering-wheel and no accommodation need be provided as between the engine and the road-wheel of the bicycle. B is the cistern or reservoir for the oil by which the engine is driven.

If an electric igniting device be employed, which I prefer, it may be carried in a suitable case upon any desired part of the frame of the machine or engine and connected up in the usual manner.

Upon the steering road-wheel C of the bicycle is fixed a grooved ring C', around which and a correspondingly-grooved pulley A⁴ upon the engine-shaft a preferably round leather or similar driving belt D is passed.

In this and other applications clutches may be provided when required, so as not to interfere with the running of the bicycle should the engine not be at work. Also means may be provided for slackening or tightening the belt D.

In Fig. 2 the general arrangement is similar, but the belt D is dispensed with, the fly-wheel of the engine, if small enough, or preferably a special pulley E of suitable diameter, engaging the tire of the road-wheel C of the bicycle, and thus driving it by frictional contact. Where a special small-diameter pulley is used, I prefer to place the fly-wheel of the engine at one side of the bicycle, overlapping it, so that I may use a fly-wheel of a diameter suitable to the capacity of the engine. The arrows in the drawings show which way the wheels revolve. In this case it is desirable that the frame A' should be so arranged as to allow of the engine being moved up or down, so as to place it in contact or out of contact. It is not necessary to describe any special apparatus for effecting this, as many suitable arrangements will readily present themselves.

Having thus described my invention, what I claim, and desire to secure by Letters Patent of the United States, is—

1. The combination with a bicycle, of a motor, a frame carrying the motor and fastened to the steering-frame of the bicycle, and means for driving the steering-wheel from the motor, substantially as set forth.

2. The combination with a bicycle, of a motor, a frame carrying the motor and detachably fastened to the steering-frame of the bicycle, and means for driving the steering-wheel from the motor, substantially as set forth.

EDWARD J. PENNINGTON.

Witnesses:
ARTHUR B. SEIBOLD,
SIDNEY P. HOLLINGSWORTH.